July 6, 1948.　　　　T. B. CHACE　　　　2,444,631
MIXER VALVE AND CONTROL
Filed March 10, 1944　　　　　　　　　　　　3 Sheets-Sheet 2
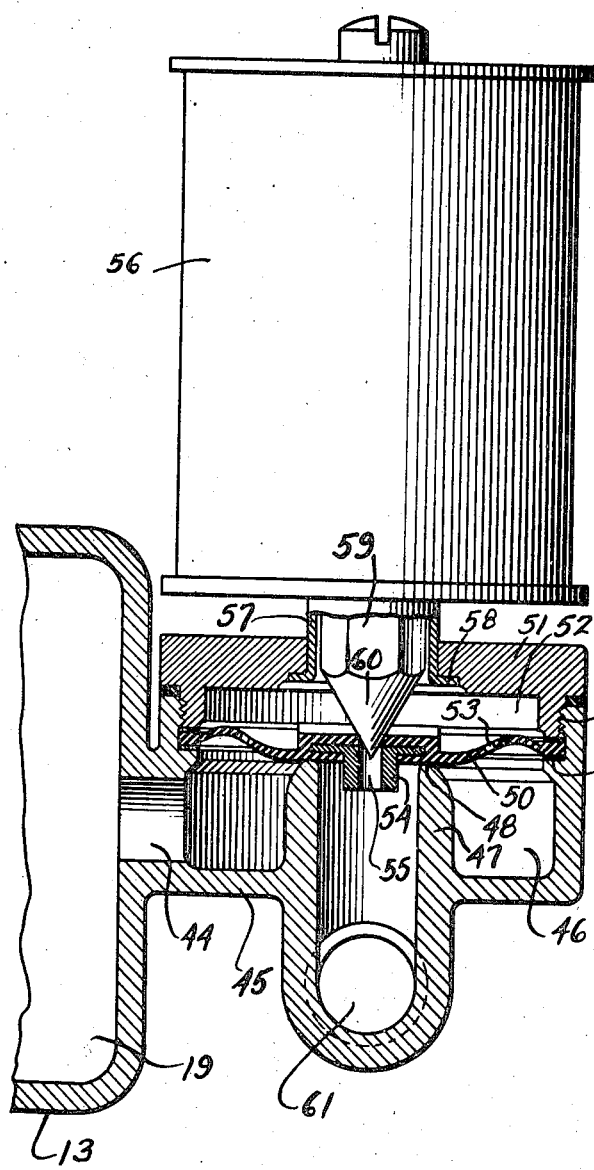
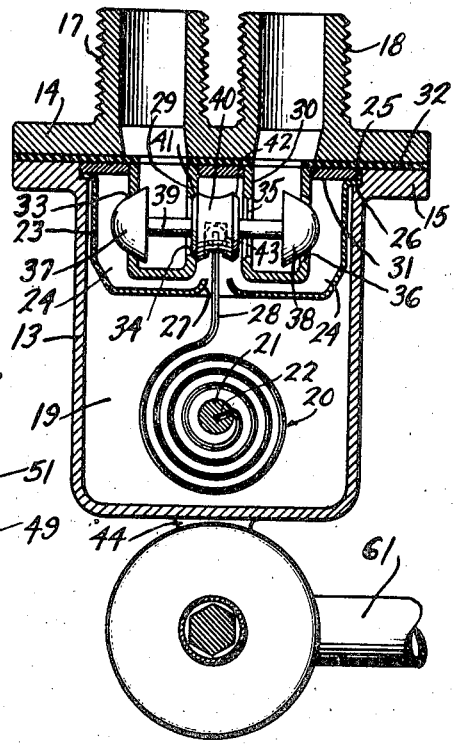
Inventor
THOMAS B. CHACE.
by Charles H. Fields
Attys.

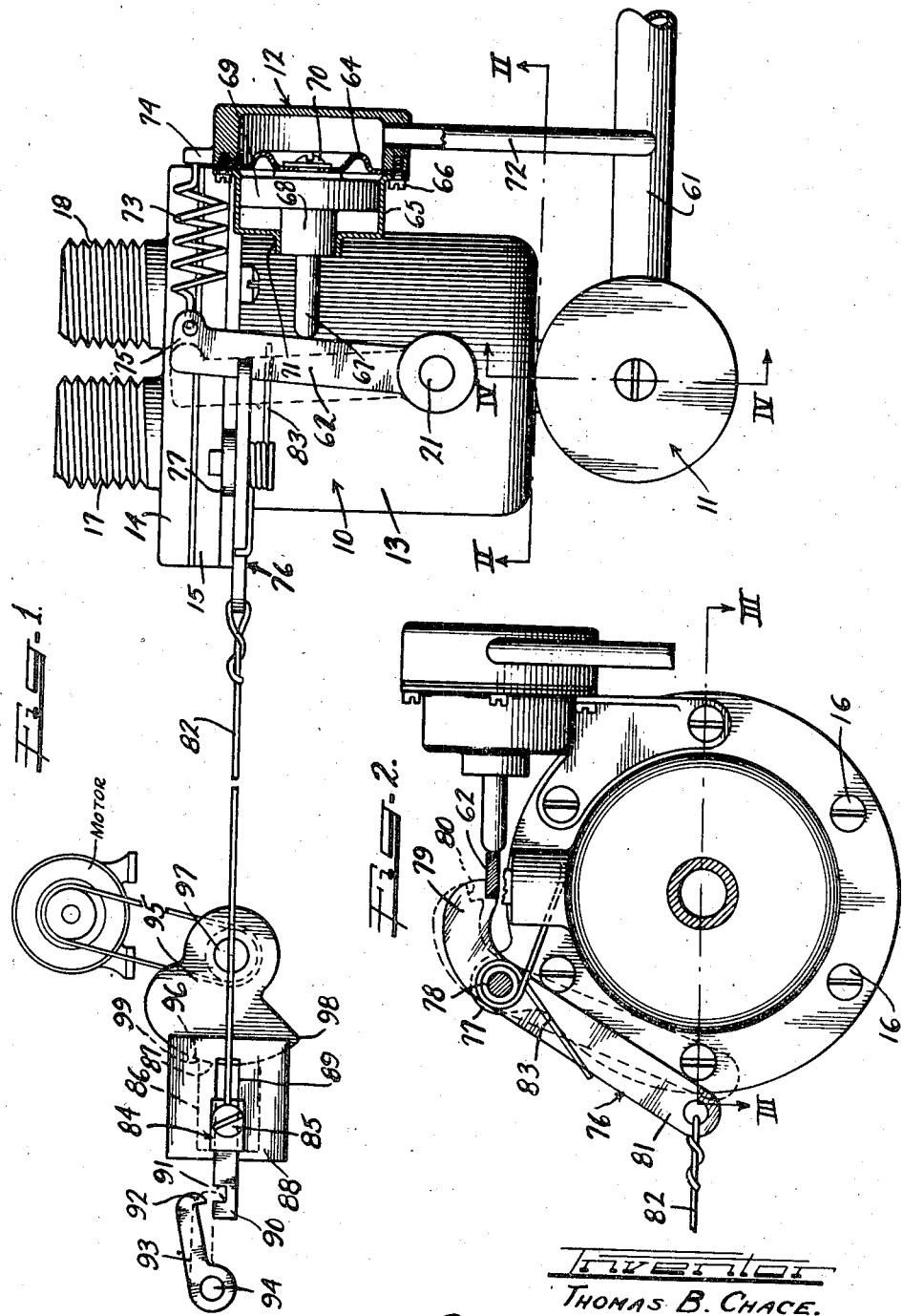

July 6, 1948.  T. B. CHACE  2,444,631
MIXER VALVE AND CONTROL
Filed March 10, 1944  3 Sheets-Sheet 3
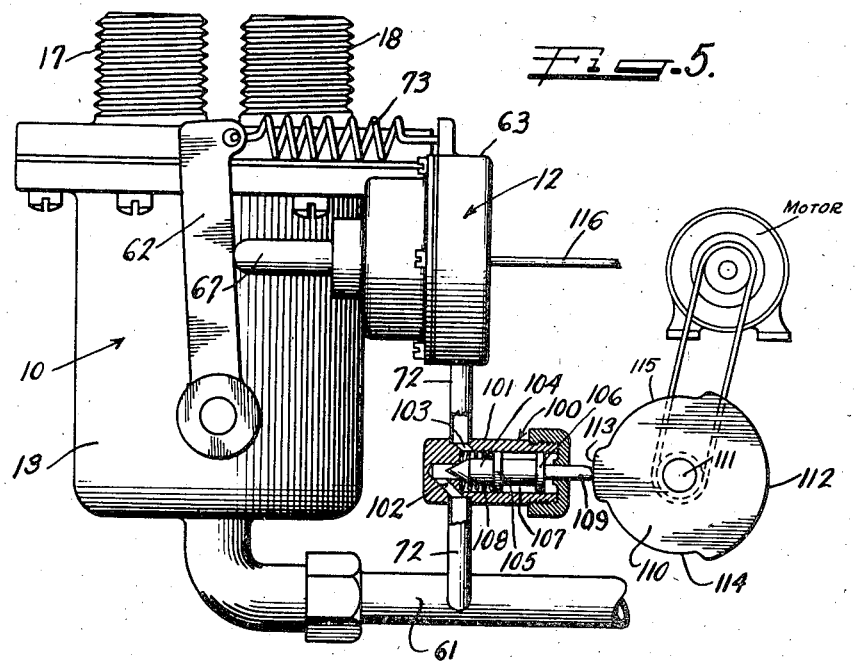
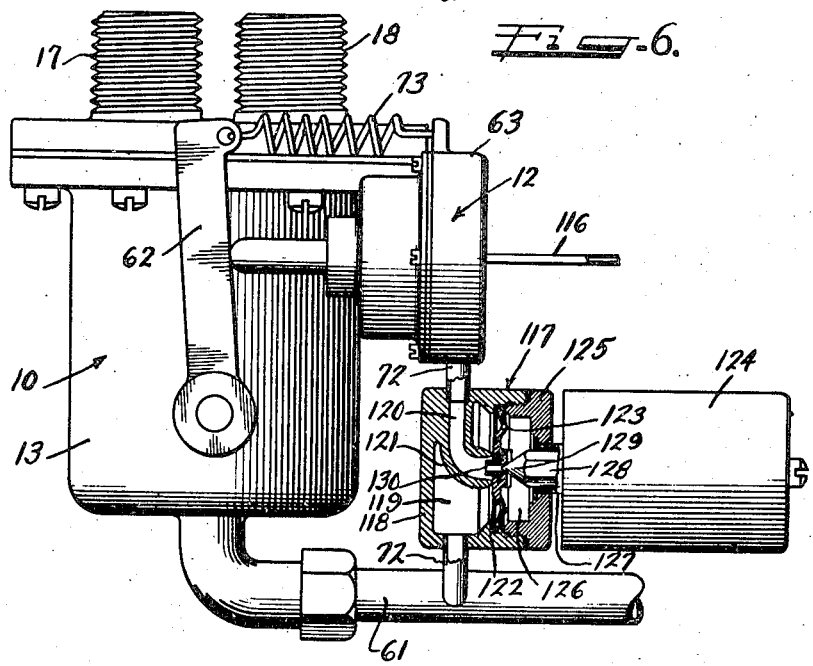
Inventor
THOMAS B. CHACE.
by Charles H. Mills Attys.

Patented July 6, 1948

2,444,631

UNITED STATES PATENT OFFICE 2,444,631

MIXER VALVE AND CONTROL

Thomas B. Chace, Chicago, Ill., assignor to The Dole Valve Company, Chicago, Ill., a corporation of Illinois Application March 10, 1944, Serial No. 525,851

14 Claims. (Cl. 236—12)

1

This invention relates to a fluid control unit and its associated mechanism and more particularly to a mixer valve and control.

Various means have been provided in the past for automatically maintaining a constant fluid temperature in a fluid supply system, such, for example, as the fluid supply system of an automatic washing machine. These devices operate to properly proportion and mix fluids coming from a source of fluid of a relatively high temperature and a source of fluid of a relatively low temperature to deliver the fluid at some intermediate temperature which remains constant during the delivery operation.

It is frequently desirable, in fluid supply systems, to automatically deliver fluid of one temperature at one stage of a cycle of operation and to deliver fluid of a different temperature at a subsequent stage in the cycle of operation. It is also desirable under certain circumstances to provide a further control which will prevent a shift in the temperature setting during the sequential operation in order that the same temperature be maintained throughout the entire cycle of successive delivery operation.

One of the principal features and objects of the present invention is to provide a novel fluid control device capable of performing the above referred to functions.

Another object of the present invention is to provide a novel mixer valve and control which is economical to manufacture and which is rugged and reliable in use.

A further object of the present invention is to provide an automatic temperature controlled fluid mixer valve having a novel means for changing the temperature setting of the mixer valve.

A still further object of the present invention is to provide a novel means for adjusting the temperature setting of an automatic temperature controlled mixer valve.

Another and further object of the present invention is to provide a novel control device including an automatic temperature controlled mixer valve in which a portion of the fluid in the outlet duct of the mixer valve is bled back to operate the mechanism for varying the temperature setting of the mixer valve.

The novel features which I believe to be characteristic of my invention are set forth with particularity in the appended claims. My invention itself, however, both as to its manner of construction and method of operation, together with further objects and advantages, may best be understood by reference to the following description

2 taken in connection with the accompanying drawings, in which:

Figure 1 is a plan view partly in section of a mixer valve and control embodying the novel teachings of the present invention;

Figure 2 is a front elevational view of a portion of the mixer valve and control with certain parts broken away and as generally viewed along the line II—II of Figure 1;

Figure 3 is a horizontal sectional view of the mixer valve portion of the unit of Figure 1 as taken along the line III—III of Figure 2;

Figure 4 is an elevational view partly in section of the solenoid operated shut-off valve as taken along the line IV—IV of Figure 1;

Figure 5 is a plan view partly in section of a modified form of the present invention; and Figure 6 is a plan view partly in section of a third embodiment of the present invention.

Referring to the embodiment of the invention illustrated in Figures 1 to 4 of the drawings, there is illustrated therein a mixer valve and control which includes a thermostatically controlled mixer valve 10, a solenoid operated diaphragm shut-off valve 11 and a fluid operated control 12 which is arranged to change the temperature setting of the mixer valve 10.

The mixer valve 10 includes a casting or housing 13 and an end plate 14 which is bolted to the flange 15 formed at one end of the housing 13. The end plate 14 is provided with two projecting externally threaded hollow shank portions 17 and 18, which are arranged to be connected to a source of fluid under relatively low temperature and a second source of fluid under relatively high temperature respectively. The housing 13 has an interior chamber portion 19 in which a spirally coiled bimetallic thermostatic element 20 is mounted on a shaft 21. The inner end 22 of the thermostat 20 is securely anchored to the shaft 21 such as is illustrated in Figure 3 of the drawings.

Mounted within the casting 13 is an inner shell 23 which provides a mixing chamber 24. One end of the inner shell 23 is provided with a flange 25 which is seated on a shoulder 26 in the casting 13. The other end of the shell 23 is provided with a wall portion having a central aperture 27 through which the free end 28 of the thermostat 20 extends. A cold fluid inlet chamber 29 and a hot fluid inlet chamber 30 are mounted on an end plate 31 which closes off the end of the shell 23 which lies adjacent the end plate 14 of the main casting 13. The cold fluid inlet chamber 29 is in open communication with the hollow shank portion 17, while the hot fluid inlet chamber 30 is in open communication with the hollow shank portion 18. A gasket 32 is preferably disposed between the flange 15 and the plate 14, the gasket being apertured opposite the openings into the cold and hot fluid inlet chambers 29 and 30 respectively. As will be apparent from an inspection of Figure 3 of the drawings, the cold and hot fluid inlet chambers 29 and 30 project down into the shell 23. These inlet chambers 29 and 30 are provided with aligned openings 33, 34, 35 and 36 which provide valve seats for the valves presently to be described.

A balanced valve construction operated by the thermostat 20 is provided for the valve seats 33, 34, 35 and 36. As is shown in Figure 3 of the drawings, a pair of valves 37 and 38 are mounted on a valve stem 39 and are arranged to engage the valve seats 33 and 36. These valve members 37 and 38 are generally in the form of spherical segments which are arranged to close their respective valve ports in the direction of fluid flow. Also mounted on the valve stem 39 is a valve member 40 having a tapered portion 41 and a second tapered portion 42 which are arranged to be seated on the valve seats 34 and 35 respectively. This valve member 40 is connected through a ball joint 43 to the free end of the thermostat 20.

From the above description it will be understood that when the valve stem 39 is in the position as shown in Figure 3 of the drawings, the ports in the cold fluid inlet chamber 29 which open into the mixing chamber 24, are closed by the valves 37 and 40. The ports in the hot fluid inlet chamber 30 are opened by virtue of the fact that the free end 28 of the thermostatic element 20 is in its extreme left position. As hot fluid flows into the hot fluid inlet chamber 30, out through the ports 35 and 36 into the mixing chamber 24 and then into the thermostat chamber 19 the thermostat will be heated up and as the fluid temperature rises the free end 28 of the thermostat will start to move to the right, thus partially closing the hot fluid outlet port and partially opening the cold fluid outlet port. A substantially constant fluid temperature is maintained by the action of the thermostat 20 and the corresponding movement of the valves 37, 38 and 40. The mixed fluid outlet duct from the chamber 19 of the casting 13 is indicated at 44 (see Figures 3 and 4).

As may be seen best in Figure 4 of the drawings, the casting 13 includes a projecting portion 45 which provides an auxiliary housing for a diaphragm shut-off valve. More particularly, the auxiliary housing portion 45 includes a fluid inlet chamber 46 into the central portion of which projects a hollow boss 47. The upper end 48 of the boss 47 lies opposite a shoulder 49 formed on the interior wall of the housing portion 45. A diaphragm 50 formed of flexible material, such, for example, as rubber, is clamped on the shoulder 49 by a cap 51 which is threaded into the upper end of the housing portion 45 as at 51. The cap 51 is formed to provide a chamber 52 immediately above the diaphragm 50, for a reason which will presently be explained. The diaphragm 50 is provided with a plurality of bleeder holes 53 which communicate the inlet chamber 46 with the upper chamber 52. The central portion of the diaphragm 50 is reinforced with a collar or eyelet 54 and the diaphragm 50 and eyelet 54 are centrally apertured as at 55.

A solenoid 56 is mounted on the cap 51 through the medium of a sleeve 57 which extends up through the core of the solenoid and which extends through the top of the cap 51. Preferably the sleeve 57 is closed at its upper end and is provided at its lower end with a lip portion 58 to which the cap 51 is secured in any suitable manner such as by brazing or soldering. The solenoid 56 is equipped with an armature 59 formed of paramagnetic material, the lower end of which is tapered as at 60 to provide a pilot valve for closing the opening 55 in the diaphragm 50.

It is to be understood that when the solenoid 56 is deenergized the armature 59 drops down to its lower position causing the pilot valve portion 60 to close the opening 55. Fluid under pressure in the inlet chamber 46 of the housing portion 45 passes up through the bleeder holes 53 and causes the diaphragm 50 to remain in seated position against the upper end 48 of the boss 47. This boss 47 at its lower end communicates with the fluid outlet duct 61 which is the main fluid delivery pipe of the device. When the solenoid 56 is energized the armature 59 is drawn up into the solenoid thus opening the passageway 55 in the central portion of the diaphragm 50. Since this central passageway 55 is larger than the combined area of the bleeder holes 53 fluid is drained out of the chamber 52 faster than it enters. This results in the diaphragm 50 being raised by the fluid pressure acting on the under side thereof.

As has been pointed out above, the thermostat 20 is designed to maintain a substantially constant temperature in the fluid delivered by the delivery pipe 61. The particular temperature value may be varied by rotating the shaft 21 to a limited extent. This shaft 21 extends through the wall of the casting 13 and is provided at its outer end with an arm or lever 62 as is clearly shown in Figure 1.

As shown in the illustrated embodiment of the invention, the arm 62 is arranged to be moved between the position as shown in the full lines in Figure 1 and the position as shown in the dotted lines in Figure 1, the latter position representing a relatively higher temperature setting than the former. That is to say, the arm 62 is moved in a counter-clockwise direction causing limited counter-clockwise movement of the shaft 21 as viewed in Figure 1 or 3 to increase the temperature setting for which the automatic temperature controlled mixer valve 10 is set.

The fluid actuating unit 12 for the lever 62 includes a housing 63 which is in the form of a cup shaped member having a yieldable diaphragm 64 clamped across its open end. More particularly, the outer marginal edge of the diaphragm 64 is held in place by means of a cap 65 which is bolted to the housing 63 by bolts 66. The outer marginal edge of the diaphragm 64 is clamped between the cap 65 and the cup shaped housing 63. An actuating rod 67 having an intermediate enlarged portion 68 and a second enlarged portion 69 is bolted to the diaphragm as at 70. The relatively large end portion 69 is arranged to have a free sliding fit in the cap 65 and the intermediate portion 68 is arranged to have a free sliding fit within the collar portion 71 of the cap 65. The actuating arm 67 extends into engagement with the lever 62 in the manner shown in Figure 1 of the drawings.

The interior of the housing 63 is subjected to fluid pressure through a bleed pipe 72 which extends off of the main fluid delivery pipe 61. It will thus be understood that whenever the solenoid operated shut-off valve 11 is open and fluid is flowing through the delivery duct 61 the housing 63 is filled with fluid under pressure which tends to move the diaphragm to the left, as viewed in Figure 1, and hence tends to move the temperature setting lever 62 to the left. This lever 62 is normally biased to its relatively cold temperature setting position by a tension spring 73 which is secured at one end to an ear 74 on the housing 63 and is secured at the other end to the upper end 75 of the lever 62.

An automatic or manually operated latch 76 is associated with the lever 62 which under conditions presently to be described prevents movement of the temperature setting lever 62 to its hot position even though the housing 63 contains fluid under pressure. This latch 76 is pivotally mounted on an ear 77 by means of a pin 78 at an intermediate point of the lever. The nose 79 of the lever 76 is notched out as at 80 in order to fit around the lever 62, when the latch 76 is in its latching position. The latch 76 also includes a tail portion 81 to which a Bowden wire or other connecting member 82 is secured. The latch 76 is biased to its unlatched position by means of a spring 83 which is coiled around the pin 78 and which extends into engagement at one end with the casting 13 and at its other end with the latch 76.

The opposite end of the Bowden wire or connecting member 82 is connected to a sliding block 84 by means of a set screw 85. This sliding block 84 includes a base portion 86 having an arcuate end surface 87. The sliding block 84 is mounted on a plate member 88 having a slot 89 therein. The mounting plate 88 extends between the portion of the sliding block 84 to which the set screw 85 is secured, and the base portion 86.

The block 84 includes a tail portion 90 which is notched as at 91 to receive the hook shaped end 92 of a manually operated latching finger 93 mounted on a rotatable shaft or pin 94.

A timer operated cam 95 having a cam surface 96 is mounted on a rotating shaft 97 driven by a timer motor (not shown) in a clockwise direction, as viewed in Figure 1 of the drawings.

From an inspection of Figure 1 it will be observed that the sliding block 84 is moved to its left-hand position when the cam surface 96 of the cam 95 is in engagement with the arcuate end surface 87 of the base portion 86 of the block 84. As the cam 95 continues to rotate in a clockwise direction and the point 98 at the trailing end of the cam surface 96 passes the point 99 on the base portion 86 of the block 84, the block 84 will snap over to its right-hand position in the slot 89 due to the biasing action of the spring 83 on the latch 76. This moves the latch 76 to its dotted line position as shown in Figure 2 and permits the temperature setting lever 62 to be moved to its high temperature position the next time the shut-off valve 11 is open.

In order to illustrate the operation of the mixer valve and control, let it be assumed that the same is employed in the fluid delivery system of an automatic washing machine. Let it further be assumed that the top (not shown) of the automatic washing machine is to be filled at one stage in the cycle of operation with water at 100° temperature and at a second stage in the cycle of operation at 140° temperature and at a final stage in the cycle of operation at 100° temperature. The thermostat temperature setting lever 62, as shown in its full line position in Figure 1, represents its position for automatically maintaining a constant fluid temperature of 100° in the fluid delivery pipe 61. When the lever is moved to its dotted line position, as shown in Figure 1, it is set to maintain a constant fluid temperature of 140° in the fluid delivery pipe 61. The fluid in the tub will, of course, be drained therefrom between each of the successive fluid delivery steps. The solenoid 56 of the shut-off valve 11 is electrically energized through an automatic cycling mechanism of the automatic washing machine. Now, just prior to the time when the solenoid 56 of the shut-off valve 11 is energized for the first fluid delivery step in the cycle of operation, the cam 95 has moved to a position where the cam surface 96 is in engagement with the end surface 87 of the block 84. Since prior to the energization of the solenoid 56 no fluid is flowing through the delivery pipe 61 the spring 73 will be holding the lever 62 in its right-hand position, as shown in Figure 1, and thus actuation of the sliding block 84 by the cam 95 enables the latch 76 to be moved into a position which caused the notched out portion of the nose 79 to be seated on the lever 62. As the shut-off valve 11 opens fluid under pressure enters the housing 63 and tries to move the operating rod 67 to the left to change the temperature setting of the automatic temperature controlled mixing valve 10. It is unable to do this, however, since the latch 76 is in engagement with the lever 62. For that reason, fluid is delivered through the fluid delivery pipe 61 to the tub of the automatic washing machine at 100° temperature.

When the desired amount of fluid has entered the tub of the washing machine, the solenoid 56 is deenergized causing the shut-off valve 11 to close. Either simultaneously with the deenergization of the solenoid 56 or at a short time thereafter the point 98 at the trailing edge of the cam surface 96 passes the point 99 on the end surface 87 of the block 84 and thus permits the spring 83 to move the latch 76 out of engagement with the lever 62. At this time, however, no fluid is flowing through the fluid delivery pipe 61 and the spring 73 thus maintains the lever 62 in its 100° temperature setting position.

The second fluid delivery stage in the cycle of operation of the automatic washing machine calls for delivery of fluid through the fluid delivery pipe 61 at 140° temperature. As soon as the shut-off valve 11 is opened by energization of the solenoid 56 fluid under pressure enters the housing 63 and this fluid pressure tires to move the actuating rod 67 to the left. Since the latch 76 is out of engagement with the lever 62 there is no resistance to this movement other than the spring 73 and hence the lever 62 is moved to its high temperature setting position as shown by the dotted lines in Figure 1. This results in fluid being delivered to the fluid delivery pipe 61 at 140° temperature. When the tub is filled to its desired level the shut-off valve 11 is closed and the fluid in housing 63 is drained out through the bleeder pipe 72 into the fluid delivery line 61. The spring 73 now moves the lever 62 to its cold or lower temperature position. After this operation is completed the cam 95 upon continued rotation moves the cam surface 96 into engagement with the end surface 87 of the sliding block 84 and causes the latch 76 to be moved to its latched position with the notched out portion 80 of the nose 79 seated on the lever 62. When fluid is again to be delivered to the tub the shut-off valve 11 is opened and fluid flows in the fluid delivery line 61, and fluid under pressure also passes up through the bleeder pipe 72 into the housing 63. As in the first stage of the cycle of operation, the fluid in the housing 63 is unable to move the actuating rod 67 due to the fact that the lever 62 is held by the latch 76 in its cold temperature setting position. Fluid at 100° temperature is thus again delivered to the tub of the automatic washing machine through the fluid delivery pipe 61 and this continues until the shut-off valve 11 again closes.

If, for some reason, fabrics are being washed in the automatic washing machine which might be damaged by the fluid at 140° temperature, a manually operated latching finger 93 may be moved down to interlock with the tail 99 of the sliding block 84 and thus hold the latch 76 in its latched position against the lever 62 irrespective of the position of the cam 95. Under such circumstances, fluid at 100° temperature would be delivered to the tub of the automatic washing machine at each of the three successive fluid delivery stages in the cycle of operation.

A second embodiment of the present invention is illustrated in Figure 5 of the drawings. Those portions of the construction of the embodiment shown in Figure 5 which are similar to corresponding parts in the first described embodiment of the invention will be given the same reference numerals.

Referring now to Figure 5, there is shown therein an automatic temperature controlled mixer valve 10 having threaded fluid inlet nipples 17 and 18 and having a fluid delivery duct 61. Although a solenoid operated shut-off valve may be provided in the form of the invention shown in Figure 5 as a unitary part of the casting 13, for purposes of indicating the wide application of this particular embodiment, no shut-off valve is shown. It is to be understood, however, that in normal use of the device shown in Figure 5, some form of shut-off valve is preferably provided in the fluid delivery line 61, but this may be added at any point beyond the bleeder pipe 72 if desired. As was the case in the first embodiment of the invention, the automatic temperature controlled mixer valve 10 is provided with a temperature setting lever 62 which is biased by a spring 73 to its relatively cold position. Mounted on the casting 13 of the automatic temperature controlled mixing valve 10 is a fluid operated temperature setting device 12 similar to that described in connection with Figure 1 of the drawings. In the form of the invention shown in Figure 5, however, no latch lever equivalent to the latch lever 76 of Figure 2 is provided. On the other hand, a cam operated valve 100 is provided in the bleeder line 72 for the purpose of controlling the flow of fluid under pressure to the chamber within the housing 63. While the shut-off valve 100 in the bleeder line 72 may be of any suitable form, a needle valve has been shown for purposes of illustration. The valve 100 includes a casing 101 having an inlet passageway 102 and an outlet passageway 103 interposed in the bleeder line 72. The valve also includes a needle valve member 104 having flange rings 105 and 106 thereon which make a sliding fit with the walls of the bore 107 in the casing 101. The valve is biased to its normally open position by means of a spring 108. The valve member 104 includes a tail portion 109 which rides on a cam 110 mounted on a rotatable shaft 111. This rotatable shaft 111 is preferably driven by a timer motor, particularly when the fluid control unit shown in Figure 5 is employed in an automatic washing machine. The cam 110 includes a high portion 112 and a second high portion 113 and two low portions 114 and 115. Whenever the high portions 112 and 113 of the cam 110 are in engagement with the tail 109 of the valve member 104, the valve 100 is in its closed position and no fluid under pressure is introduced into the interior chamber of the housing 63. Under such circumstances, the lever 62 maintains the thermostat of the automatic temperature controlled mixer valve 10 in its relatively cold position. Due to the fact that fluid cannot flow freely back through the bleeder pipe 72 to relieve the fluid pressure in the chamber 63 preferably a small drain pipe 116 is provided in the unit 12 which bleeds fluid from the interior chamber of the housing 63 at a relatively low rate. The bore of drain pipe 116 is substantially smaller in cross-sectional area than the bore of pipe 72 in order that fluid will enter housing 63 faster than it leaves when valve 104 is open and thus build up a pressure against diaphragm 64. However, when valve 104 is closed the fluid pressure on diaphragm 64 is relieved by draining a portion or all of the fluid from housing 63 through pipe 116.

When the low portions 114 and 115 of the cam 110 are in engagement with the tail 109 of the valve member 104, the valve 100 is opened and fluid under pressure is introduced into the housing 63 whenever fluid flows through the delivery pipe 61.

From the above description it will be apparent that whenever the high portions of the cam 110 are in engagement with the valve tail 109, the automatic temperature controlled mixer valve 10 is set to deliver fluid at a relatively low temperature and whenever the low portions 114 and 115 of the cam 110 are in engagement with the valve tail 109, the automatic temperature controlled mixer valve 10 is arranged to deliver fluid at a relatively high constant temperature.

A third embodiment of the present invention is illustrated in Figure 6 of the drawings. This embodiment of the present invention is similar to that described in connection with Figure 5 with the exception that a solenoid operated shut-off valve 117 is provided in the place of a cam operated valve 100. This solenoid operated shut-off valve 117 includes a valve casing or housing 118 having a fluid inlet chamber 119 and a fluid outlet duct 120. The fluid outlet duct 120 is in the form of an elbow 121 which projects into the inlet chamber 119 and terminates adjacent a flexible diaphragm 122 having bleeder holes 123 therein. An electric solenoid 124 is mounted on the cap 125 which retains the diaphragm 122 in place and which provides an upper chamber 126. A sleeve 127 closed at one end extends up through the core of the solenoid 124 and extends through the cap 125 as shown in the drawings. The closed end (not shown) of the sleeve 127 is at the end thereof remote from the cap 125. This provides the means by which the solenoid 124 is mounted on the cap 125. An armature 128 having a tapered end portion 129 provides a pilot valve for controlling the flow of fluid through the central aperture 130 in the diaphragm 122. This solenoid operated shut-off valve operates in the same manner as that described in connection with the solenoid operated shut-off valve 12 of the first described embodiment of the invention.

By providing a solenoid operated shut-off valve in the bleeder line 72 leading to the fluid control unit 12, it will readily be apparent that the automatic temperature controlled mixer valve 10 may have its temperature setting changed between either of two positions at will. Since the shut-off valve 117 in the bleeder line 72 is electrically operated, it will also be apparent that this shut-off valve may be very easily and conveniently controlled in any automatic sequential control system, such, for example, as in an automatic washing machine.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit connecting said outlet duct to said chamber, a valve in said bleeder duct and cyclically operating means for actuating said valve.

2. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit connecting said outlet duct to said chamber, a valve in said bleeder duct and cyclically operating, electrical means for actuating said valve.

3. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit connecting said outer duct to said chamber, a valve in said bleeder duct, and a timer operated cam for controlling the opening and closing of said valve.

4. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, a shut-off valve in said mixed fluid outlet duct, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit extending from said mixed fluid outlet duct on the down-stream side of said shut-off valve to said chamber, whereby whenever said shut-off valve is opened, said actuating means is shifted to move said temperature adjusting member to said second temperature setting position, and latch means for retaining said temperature setting element in said second temperature setting position after it has once been moved there irrespective of whether fluid is flowing in said mixed fluid outlet duct.

5. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, a shut-off valve in said mixed fluid outlet duct, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit extending from said mixed fluid outlet duct on the downstream side of said shut-off valve to said chamber, whereby whenever said shut-off valve is opened, said actuating means is shifted to move said temperature adjusting member to said second temperature setting position, latch means engageable by said temperature adjusting member when said temperature adjusting member is shifted to said second temperature setting position to retain the same in place, a biasing means normally urging said latch to its latching position, and cam operated means for periodically holding said latch in an unlatched position.

6. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, a shut-off valve in said mixed fluid outlet duct, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit extending from said mixed fluid outlet duct on the downstream side of said shut-off valve to said chamber, whereby whenever said shut-off valve is opened, said actuating means is shifted to move said temperature adjusting member to said second temperature setting position, latch means engageable by said temperature adjusting member when said temperature adjusting member is shifted to said second temperature setting position to retain the same in place, a biasing means normally urging said latch to its latching position, a timer driven cam for moving said latch to an unlatched position, and a second manually operated cam for holding said first latch in an unlatched position.

7. Fluid control means comprising a fluid mixing device having a pair of fluid inlet ducts and a mixed fluid outlet duct, said mixing device also having an adjustable temperature responsive means for automatically proportioning fluids of normally different temperatures admitted through said inlet duct to maintain the resulting mixed fluid at a predetermined temperature level, a temperature adjusting member for changing the temperature setting of the temperature responsive means to maintain the mixed fluid at different selected predetermined temperature levels, a shut-off valve in said mixed fluid outlet duct, means normally biasing said temperature adjusting member to one temperature setting position, actuating means for shifting said temperature adjusting member to a second temperature setting position, said actuating means including a fluid chamber and an actuating member subjected to the pressure of fluid within said chamber to shift said temperature adjusting member when subjected to fluid pressure, a bleeder conduit extending from said mixed fluid outlet duct on the downstream side of said shut-off valve to said chamber, whereby whenever said shut-off valve is opened, said actuating means is shifted to move said temperature adjusting member to said second temperature setting position, latch means engageable by said temperature adjusting member when said temperature adjusting member is shifted to said second temperature setting position to retain the same in place, and means for holding said latch in an unlatched position.

8. Fluid control means comprising an automatic temperature controlled mixer valve having a pair of inlet ducts, a mixed fluid outlet duct and an adjustable temperature setting member, fluid pressure responsive means for changing the setting of said member, conduit means communicating between said last mentioned means and said mixer valve for passing a portion of the fluid to said pressure responsive means to actuate the same, and selectively operable means for retaining said member in one predetermined position irrespective of whether said fluid pressure responsive means is subjected to fluid under pressure.

9. Fluid control means comprising an automatic temperature controlled mixer valve having a pair of inlet ducts, a mixed fluid outlet duct and an adjustable temperature setting member, a shut-off valve in said outlet duct, fluid pressure responsive means for changing the setting of said member, means for bleeding a portion of the fluid from said outlet duct on the downstream side of said shut-off valve to said fluid pressure responsive means to actuate the same, and selectively operable means for retaining said member in one predetermined position irrespective of whether said fluid pressure responsive means is subjected to fluid under pressure or not.

10. Fluid control means comprising an automatic temperature controlled mixer valve having a pair of inlet ducts, a mixed fluid outlet duct and an adjustable temperature setting member, fluid pressure responsive means for changing the setting of said member, means for passing a portion of the fluid in the outlet duct to said fluid pressure responsive means to actuate the same, latch means for retaining said member in one predetermined position irrespective of whether said fluid pressure responsive means is subjected to fluid under pressure or not, and timer operated means for rendering said latch means effective to retain said member in said one predetermined position.

11. Fluid control means comprising an automatic temperature controlled mixer valve having a pair of inlet ducts, a mixed fluid outlet duct and an adjustable temperature setting member, fluid pressure responsive means for changing the setting of said member, means for passing a portion of the fluid from said outlet duct to said fluid pressure responsive means to actuate the same, latch means arranged to be moved to a position to retain said member in one predetermined temperature setting position irrespective of whether said fluid pressure responsive means is subjected to fluid under pressure or not, and cycling means for intermittently moving said latch means to said position for retaining said member in said one predetermined position.

12. Fluid control means comprising an automatic temperature controlled mixer valve having a pair of inlet ducts, a mixed fluid outlet duct and an adjustable temperature setting member, fluid pressure responsive means for changing the setting of said member, means for passing a portion of the fluid from said outlet duct to said fluid pressure responsive means to actuate the same, latch means arranged to be moved to a position to retain said member in one predetermined temperature setting position irrespective of whether said fluid pressure responsive means is subjected to fluid under pressure or not, cycling means for intermittently moving said latch means to said position for retaining said member in said one predetermined position, and manual means in addition to said cycling means selectively operable to prevent or allow movement of said member.

13. A fluid control means comprising an automatic temperature control mixer valve having a plurality of inlet ducts adapted to receive fluid at different temperatures, a mixed fluid outlet duct, an adjustable temperature responsive element controlling fluid flow through said inlet ducts to maintain a desired temperature of the mixed fluid, fluid pressure responsive means for changing the setting of said element, conduit means communicating between said last mentioned means and said mixer valve, and cyclically operable valve means, independent of said element, directly controlling the flow of fluid through said conduit means, thereby selectively energizing said fluid pressure responsive means according to the cycle of operation of said valve means.

14. A fluid control means comprising an automatic temperature controlled mixer valve having a plurality of inlet ducts adapted to receive fluid at different temperatures, a mixed fluid outlet duct, an adjustable temperature responsive element controlling fluid flow through said inlet ducts to maintain a desired temperature of the mixed fluid, a shut-off valve controlling fluid flow through said mixer valve, fluid pressure responsive means for changing the setting of said element, conduit means connecting the downstream side of said shut-off valve to said fluid pressure means to actuate the same when said cut-off valve is opened, and selectively operable means for retaining said element in said predetermined setting irrespective of actuation of said fluid pressure responsive means.

THOMAS B. CHACE.

REFERENCES CITED

The following references are of record in the file of this patent:

UNITED STATES PATENTS

| Number | Name | Date |
|---|---|---|
| 1,819,045 | Snediker | Aug. 18, 1931 |
| 1,853,325 | Stewart | Apr. 12, 1932 |
| 1,939,970 | Fuess | Dec. 19, 1933 |
| 2,012,285 | Otis | Aug. 27, 1935 |
| 2,193,531 | Clokey | Mar. 12, 1940 |
| 2,225,841 | Otto | Dec. 24, 1940 |
| 2,251,246 | Annin | July 29, 1941 |
| 2,287,810 | Lund | June 30, 1942 |
| 2,321,641 | Andersen | June 15, 1943 |